United States Patent [19]

Blong et al.

[11] Patent Number: 5,552,199
[45] Date of Patent: Sep. 3, 1996

[54] MELT-PROCESSABLE ELECTROCONDUCTIVE FLUOROPLASTIC

[75] Inventors: Thomas J. Blong, Woodbury, Minn.; Claude Lavallée, London, Canada

[73] Assignee: Minnesota Mining and Manufacturing Company, St. Paul, Minn.

[21] Appl. No.: 300,641

[22] Filed: Sep. 2, 1994

[51] Int. Cl.⁶ ............ C08L 27/16; C08L 27/18; C08L 27/20; C08K 3/04
[52] U.S. Cl. .......... 428/36.9; 525/199; 525/200; 525/187; 524/520; 524/487; 524/377
[58] Field of Search ................ 525/199, 200, 525/187; 428/36.9; 524/520, 377, 487

[56] References Cited

U.S. PATENT DOCUMENTS

| | | | |
|---|---|---|---|
| 2,968,649 | 1/1961 | Pailthorp et al. . | |
| 3,473,087 | 10/1969 | Slade | 317/2 |
| 3,519,703 | 7/1970 | Merkl et al. . | |
| 3,861,029 | 1/1975 | Smith-Johannsen et al. | 29/611 |
| 4,013,622 | 3/1977 | DeJuneas et al. | 260/45.95 S |
| 4,129,717 | 12/1978 | Praetorius et al. | 528/421 |
| 4,159,975 | 7/1979 | Praetorius et al. | 525/91 |
| 4,188,352 | 2/1980 | Suzuki et al. . | |
| 4,237,441 | 12/1980 | van Konynenburg et al. | 338/22 R |
| 4,293,663 | 10/1981 | Stivers . | |
| 4,318,881 | 3/1982 | Sopony | 264/346 |
| 4,328,140 | 5/1982 | Singletary et al. . | |
| 4,459,473 | 7/1984 | Kamath | 219/553 |
| 4,534,889 | 8/1985 | van Konynenburg et al. | 252/511 |
| 4,545,926 | 10/1985 | Fouts et al. | 252/211 |
| 4,560,498 | 12/1985 | Horsma et al. | 252/511 |
| 4,617,351 | 10/1986 | Heckel et al. . | |
| 4,624,990 | 11/1986 | Lunk et al. | 525/199 |
| 4,665,963 | 4/1987 | Koga et al. | 252/511 |
| 4,746,573 | 5/1988 | Arcella et al. . | |
| 4,855,360 | 8/1989 | Duchesne et al. | 525/187 |
| 4,902,444 | 2/1990 | Kolouch | 252/511 |
| 5,000,875 | 3/1991 | Kolouch | 252/511 |
| 5,110,645 | 5/1992 | Matsumoto . | |
| 5,206,293 | 4/1993 | Sakai et al. . | |
| 5,284,184 | 2/1994 | Noone et al. | 138/121 |

FOREIGN PATENT DOCUMENTS

| | | | |
|---|---|---|---|
| 0524700A1 | 1/1993 | European Pat. Off. | C08L 27/16 |
| 0551094A1 | 7/1993 | European Pat. Off. | B32B 7/04 |
| 1293667 | 10/1972 | United Kingdom . | |

OTHER PUBLICATIONS

Modern Plastics–1963 EO–pp. 227—.
Probst, N., "Carbon Black Sci. and Tech.," Donnet, J–B. et al., ed., Marcel Dekker, Inc., Chap. 8, 1993.
Probst, N., "Plastics Additives and Modifiers Handbook," Edenbaum, J., ed., Vannostrand Reinhold, N.Y., p. 630–643 (1992).
Rauwendaal, C., "Polymer Extrusion," Hansen Publisher, p. 23–48, (1986).

*Primary Examiner*—Carman J. Seccuro, Jr.
*Attorney, Agent, or Firm*—Gary L. Griswold; Walter N. Kirn; John A. Burtis

[57] ABSTRACT

This invention provides a melt-processable conductive fluoroplastic composition comprising a melt-processable, thermoplastic fluoropolymer component of interpolymerized units comprising those derived from vinylidene fluoride, a conductive particulate component comprising conductive carbon black particles, and a hydrocarbon polymer component. The composition is useful for making, for example by melt-processing, conductive shaped articles including tubing.

20 Claims, No Drawings

MELT-PROCESSABLE ELECTROCONDUCTIVE FLUOROPLASTIC

This invention relates to electrically conductive, thermoplastic, fluoropolymer compositions, their preparation and use, and to shaped articles, such as films and tubing, made by melt-processing said compositions, for example, by extrusion thereof. In another aspect, this invention relates to improving the flow properties of electrically conductive, thermoplastic, fluoropolymer compositions used to make extruded shaped articles.

Various polymers have been proposed or used as matrices for electrically conductive polymer-carbon black compositions and both polymer and carbon black properties have influence on the conductivity of the compositions—see Probst, N. in "Carbon Black Sci. and Tech.," Donnet, J-B. et al., ed., Marcel Dekker, Inc., Chap. 8, 1993.

Flowing fuel in contact with a plastic tubing can give rise to an electrostatic charge or potential which if discharged through the plastic tubing wall can lead to material breakdown and pinholes which can lead to higher emissions, fuel leakage, or potentially hazardous fires. Thus, one important application of some conductive compositions is in fuel line hose or tubing. A fuel line hose of a conductive composition aids in minimizing formation or concentration of an electrical charge and allowing dissipation of the charge to ground through connections to a vehicle chassis. Certain fluoropolymer composites used for making such fuel line hose or tubing are described in U.S. Pat. No. 3,473,087 (Slade) and European Pat. Appln. Pub. No. 0551094 (Krause et al.).

A number of other patent disclosures describe various conductive fluoropolymer-carbon black composites. See, for example, U.S. Pat. No. 5,000,875 (Koloach) which points out some difficulties associated with adding carbon black to fluoropolymers to achieve conductivity. U.S. Pat. No. 4,459,473 (Kamath) describes a wide variety of conductive polymers, including fluoropolymers, and exemplifies a blend of carbon black with copolymers of tetrafluoroethylene and ethylene, perfluoroalkoxy, or hexafluoropropylene, the blend of Example 1 of this patent including a process aid. U.S. Pat. No. 4,534,889 (van Konynenburg) describes certain conductive polymer compositions, including thermoplastic halogenated vinyl or vinylidene polymers, which may contain conventional ingredients such as processing aid. Other patent disclosures describing various fluoropolymers are U.S. Pat. Nos. 3,861,029 (Smith-Johannsen et al), 4,237,441 (van Konynenburg et al), 4,318,881 (Sopory), 4,560,498 (Horsma et al), 4,665,963 (Koga et al), and 4,902,444 (Kolouch) and European Patent Application Pub. Nos. 524,700 (Dlugosg et al).

A relatively new class of melt-processable fluoropolymers which has become commercially available is the thermoplastic terpolymers made by copolymerizing tetrafluoroethylene, hexafluoropropylene, and vinylidene fluoride. A series or family of these fluoropolymers is sold as "3M THV Fluoroplastics" and can be used to prepare, for example, molded parts and extruded films, tubes, and profiles. We have discovered that by blending hydrogen-containing fluoropolymers like the above-described THV Fluoroplastics with sufficient conductive carbon black particles and small amounts of some hydrocarbon polymers of ethylene and/or polymers of ethylene oxide, the resulting blends can be melt processed with desirable flow properties to readily form extrudates with desired electrical conductivity (or low resistance) and smooth surfaces which enable or enhance their uses where such properties are desired or required, such as in fuel line hose or tubing. These improvements are obtained without the need, for example, to modify the chemical structure of the fluoropolymer, to raise the melt-processing temperature, or to extrude at lower line speeds —measures sometimes resorted to in melt-processing plastics to reduce melt fractures or melt defects.

According to one aspect of this invention, a melt-processable, conductive fluoroplastic composition is provided which comprises a blend of (a) a fluoropolymer component which is a major amount (i.e., greater than 50%) by weight of the conductive composition and is a melt-processable, thermoplastic fluoropolymer of interpolymerized units comprising those derived from vinylidene fluoride and, preferably at least one ethylenically-unsaturated, copolymerizable, fluorinated comonomer, such as (1) fluorinated alpha-olefin represented by the formula $R_fCF=CF_2$, where $R_f$ is H, F, Cl, or a perfluoroalkyl of 1 to 8, preferably 1 to 3, carbon atoms, and, optionally, (2) minor amounts (i.e., less than 50% by weight of said fluoropolymer) of perfluoro(alkyl vinyl ether) having, for example, 1 to 4 carbon atoms, such as perfluoro(methyl vinyl ether), and/or low molecular weight non-fluorinated alpha-olefin, e.g., ethylene and propylene, which fluoropolymer forms a matrix in which are dispersed (b) a small amount (i.e., less than 20 wt % of the conductive composition) of a conductive particulate component comprising conductive carbon black particles, and (c) a small amount (i.e., less than 20 wt % of the conductive composition) of a hydrocarbon polymer component comprising a hydrocarbon polymer, such as an olefin polymer and/or poly(oxyalkylene)polymer, types of such polymers being a polymer of ethylene or propylene, e.g., polyethylene, and polyethylene glycol. The hydrocarbon polymer blend component is fluid and thermally stable at the melt-processing temperature of the fluoropolymer, for example, 180° to 280° C., and is liquid, or preferably solid at ambient temperature (20° C.) where the fluoropolymer is solid. The hydrocarbon polymer component, conductive component, and the fluoropolymer component are immiscible in each other and can be readily blended, the fluoropolymer component forming a matrix in which the other two components are uniformly dispersed. The extrudates or shaped articles of the blended components can be made with desirably high electrical conductivity (i.e., low volume resistivity, e.g., lower than $1 \times 10^7$, or 1 E7, and desirably in the range of $1 \times 10^3$ to $1 \times 10^6$ ohm-cm or lower), uniform density, and good quality surfaces, particularly smoothness, and the extrudates are otherwise relatively free of objectionable defects such as roughness and porosity.

In another aspect, this invention provides a method of making such extrudates or conductive shaped plastic articles. That method comprises blending components (a), (b), and (c), for example by first dry-blending (a) a major amount of a melt-processable, thermoplastic fluoropolymer component of interpolymerized units derived from vinylidene fluoride and (b) a small amount of a conductive particulate component comprising conductive carbon block particles, and (c) a small amount of a hydrocarbon polymer component, and then melt-processing the resulting blend, for example by extrusion, to form such extrudates or shaped articles.

Preferably the above-described fluoropolymers used in this invention are those thermoplastics having an ASTM D 1238 melt flow index of less than 1000 g/min. measured at 265° F. and with a loading of 5 kg and are melt extrudable at 250° C.

Preferred in preparing the blends of this invention are those hydrogen-containing fluoropolymers having at least 5 wt % of their interpolymerized units derived from vinylidene fluoride and more than 25 wt % of their interpolymerized units derived from a combination of tetrafluoroethylene and hexafluoropropylene such that the fluoropolymers have an amount of fluorine below 75 wt % and are melt extrudable thermoplastics.

A preferred class of the fluoropolymers is derived by copolymerizing 30 to 70 wt %, preferably 35 to 65 wt %, tetrafluoroethylene, 10 to 30 wt %, preferably 15 to 25 wt %, hexafluoropropylene, and 10 to 50 wt %, preferably 15 to 45 wt %, vinylidene fluoride.

A subclass of the fluoropolymer used in making blends of this invention are those fluoropolymers which contain interpolymerized units derived from copolymerization of a monomer charge of 45 to 65 wt % tetrafluoroethylene, 10 to 20 wt % hexafluoropropylene, and 20 to 35 wt % vinylidene fluoride. This class, described in U.S. Pat. No. 4,670,503 (Newmann et al.), have melting points of 130° to 170°, measured by the DSC ("Differential Scanning Calorimetry") method, and an ASTM D 1238 melt index of 50 to 250 g/10 min. for the melt index, measured at 265° C. and a loading of 5 kg.

Commercial fluoropolymers which can be used are said THV Fluoroplastics described in product bulletins 98 0211-7703-9(103.02)R1, 98 0211-7010-9, -7011-7, -7012-6, -7013-3, -7014-1, and -8100-7 of the Specialty Fluoropolymers Dept. of the 3M Company. Grades THV 200, THV 400, and THV 500 of these fluoroplastics have ASTM D 3418 melting ranges of 115°–125° C., 150°–160° C., and 165°–180° C. respectively, and ASTM D 1238 melt flow indices of 20, 10, and 10, respectively, at 265° C. and 5 kg. The descriptions of said THV Fluoroplastics in said product bulletins are incorporated herein by reference.

The hydrocarbon polymer, used as a blend component in making the conductive fluoroplastic compositions of this invention, is a non-fluorinated polymer (and characterizing it as "hydrocarbon" distinguishes it from the fluoropolymer blend component). A class of the hydrocarbon polymers is that comprising or consisting essentially of polymers represented by said formula $-[CH_2-CHR(O)_z]_n-$ where R is H, $C_1$ to $C_6$ alkyl radical or COOR', where R' is a $C_1$ to $C_6$ alkyl radical, z is zero or 1, and n is preferably at least 18 and can be as high as 2000 or higher, e.g., 10,000 or more. This class of polymers includes hydrocarbon olefin polymers of ethylene and polymers of propylene, including homopolymers of such alpha-olefins and copolymers of either olefin with the other or either or both of them with one or more higher alpha-olefins and up to 30 wt %, but preferably 20 wt % or less, of one or more copolymerizable ethylenically-unsaturated comonomers which are copolymerizable with such olefins, e.g., vinyl ester compounds, such as vinyl acetate. Said olefins can be represented by the general structure $CH_2=CHR$, where R is a hydrogen or an alkyl radical which contains not more than 10 carbon atoms and preferably 1 to 6 carbon atoms. Representative olefins are ethylene, propylene, 1-butene, 1-hexene, 4-methyl-1-pentene, and 1-octene. Representative monomers which are copolymerizable with said olefins are vinyl esters, such as vinyl acetate, vinyl propionate, vinyl butyrate, vinyl chloroacetate, and vinyl chloropropionate; vinyl alcohol; acrylic and alpha-alkyl acrylic acids, and their alkyl esters, amides, and nitriles, such as acrylic acid, methacrylic acid, ethacrylic acid, methyl acrylate, ethyl acrylate, N,N-dimethyl acrylamide, methacrylamide, and acrylonitrile; vinyl aromatics, such as styrene, o-methoxystyrene, p-methoxystyrene, and vinyl naphthalene; vinyl and vinylidene halides, such as vinyl chloride, vinylidene chloride, and vinylidene bromide; alkyl esters of maleic and fumaric acids and anhydrides, such as dimethyl maleate, diethyl maleate, and maleic anhydride; vinyl alkyl ethers, such as vinyl methyl ether, vinyl ethyl ether, vinyl isobutyl ether, and 2-chloroethyl vinyl ether; vinyl pyridine; N-vinyl carbazole; N-vinyl pyrolidone; and dienes, such as 1,3-butadiene. The hydrocarbon olefin polymers also include the metallic salts of said olefin copolymers, which contain free carboxylic acid groups. Illustrative of the metals which can be used to provide the salts of said carboxylic acid polymers are the mono-, di-, and tri-valent metals, such as sodium, lithium, potassium, calcium, magnesium, aluminum, barium, zinc, zirconium, beryllium, iron, nickel, and cobalt. Representative examples of hydrocarbon olefin polymers useful in this invention are polyethylene, polypropylene, and copolymers of ethylene with propylene, 1-butene, 1-hexene, 4-methyl-1-pentene, or 1-octene.

Representative blends of thermoplastic olefin hydrocarbon polymers useful in this invention are blends of polyethylene and polypropylene, low-density polyethylene and high-density polyethylene, and polyethylene and olefin copolymers containing said copolymerizable monomers, some of which are described above, e.g., ethylene and acrylic acid copolymers; ethylene and methyl acrylate copolymers; ethylene and ethyl acrylate copolymers; ethylene and vinyl acetate copolymers, and ethylene, acrylic acid, and vinyl acetate copolymers.

The preferred thermoplastic olefin hydrocarbon polymers are thermoplastic homopolymers of ethylene and propylene and copolymers of ethylene with 1-butene, 1-hexene, 1-octene, 4-methyl-1-pentene, or propylene.

Commercially available hydrocarbon olefin polymers which can be used in this invention include Escorene™ LL-3001.00, LL-5202, LD411.09, and LD760.36 polyethylenes, Iotek™ 7030 ionomer, and Escor™ ATX310 acid terpolymer, all from Exxon Chem. Co.; ER1833 polyethylene from Chevron Chemical Co.; Novapol™ TF 0119F polyethylene from Novacor Chemicals Inc.; Dowlex™ 2047 polyethylene from Dow Chemical Co.; Marlex™ HMN 4550 polyethylene from Phillips 66 Co.; 3374X polypropylene from Fina Oil and Chemical Co.; and Polysar™ EPM 306 and EPDM 345 ethylene propylene rubbers from Miles, Inc., Polysar Rubber Div.

Two or more of the above-described hydrocarbon olefin polymers can be used as blend component (c). Or one or more of such polymers can be blended and used together with poly(oxyalkylene) polymers, such as polyethylene glycol, as blend component (c), each being, for example, 5 to 95 wt. % of the hydrocarbon blend component (c).

The hydrocarbon polymers useful in this invention as a blend component can also be poly(oxyalkylene) polyols and their derivatives, which can be used alone or with said hyrocarbon polymers. A class of such poly(oxyalkylene) polymers can be represented by the general formula $A[(OR^1)_xOR^2]_y$, preferably $A[(OCH_2CH_2)_xOH]_y$, where A is an active hydrogen-free residue of a low molecular weight, initiator organic compound having a plurality of active hydrogen atoms (e.g., 2 or 3), such as a polyhydroxyalkane or a polyether polyol, e.g., ethylene glycol, glycerol, 1,1,1-trimethylol propane, and poly(oxypropylene) glycol; y is 2 or 3; the $(OR^1)_x$ is a poly(oxyalkylene) chain having a plurality of oxyalkylene groups, $(OR^1)$, wherein the $R^1$ radicals can be the same or different, and are selected from the group consisting of $C_1$ to $C_5$ alkylene radicals and preferably $C_2$ or $C_3$ alkylene radicals; and x is the number of oxyalkylene units. Said poly(oxyalkylene) chain can be a homopolymer chain, e.g. poly(oxyethylene) or poly(oxypropylene), or a chain of randomly distributed (i.e., a heteric mixture) oxyalkylene groups, e.g. a copolymer of —$OC_2H_4$— and —$OC_3H_6$— units, or a chain having alternating blocks or backbone segments of repeating oxyalkylene groups, e.g. a polymer comprising $-(OC_2H_4)_a$ and $-(OC_3H_6)_b$ blocks, where a+b=5 to 5000 or higher, e.g., 20,000 or more and preferably 10 to 300. $R^2$ is H or an organic radical, such as alkyl, aryl, or a combination thereof such as aralkyl or alkaryl, and may contain O or N hetero atoms. For example, $R^2$ can be methyl, butyl, phenyl, benzyl, and acyl groups such as acetyl ($CH_3CO$—), benzoyl ($C_6H_5CO$—) and stearyl ($C_{17}H_{35}CO$—).

Representative poly(oxyalkylene) polymer derivatives can include poly(oxyalkylene) polyol derivatives wherein the terminal hydroxy groups have been partly or fully converted to ether derivatives, e.g. methoxy groups, or ester derivatives, e.g. stearate groups, ($C_{17}H_{35}COO$—). Other useful poly(oxyalkylene) derivatives are polyesters, e.g. prepared from dicarboxylic acids and poly(oxyalkylene) glycols. Preferably, the major proportion of the poly(oxyalkylene) polymer derivative by weight will be the repeating oxyalkylene groups, ($OR^1$).

Said poly(oxyalkylene) polyols and their derivatives can be those which are solid at room temperature and have a molecular weight of at least about 200 and preferably a molecular weight of about 400 to 20,000 or higher, e.g. 200,000 or more.

Poly(oxyalkylene) polyols useful in this invention include those polyethylene glycols which can be represented by the formula $H(OC_2H_4)_nOH$, where n is, for example, about 15 to 3000, such as those sold under the trademark Carbowax, such as Carbowax™ PEG 8000, where n is about 181, and those sold under the tradename Polyox, such as Polyox™ WSR N-10 where n is about 2272.

The lower limit of amount of the hydrocarbon polymer component (c) to be blended with the fluoropolymer and conductive components will generally be an amount at which an increase in extrusion rate of the blend occurs before surface or interior defects are observed in extrudates of the blend, as compared to a blend of the same fluoropolymer and conductive components that is not blended with the hydrocarbon polymer component. Generally, the amount of the hydrocarbon polymer component will be about 0.1 to 10 wt %, more preferably about 0.5 to 5 wt % by weight of the fluoropolymer component, conductive component, hydrocarbon polymer component blend. The particular blend components chosen will have a bearing on the particular amount of hydrocarbon polymer component to be used, and simple sample extrusions can be run to determine that particular amount.

The conductive carbon black particulate used as a blend component in preparing the conductive fluoroplastic compositions of this invention can be any of those known materials added to resins to produce a desirably less-resistive system or render the resin system conductive. Generally, the conductive carbon black particles to be used will have high surface area, e.g., greater than 150 m²/g, high structure, e.g., dibutyl phthalate absorption ("DBT") numbers preferably greater than 150, and low volatility, e.g., volatile contents of less than 2.5 wt %. Conductive grades of carbon black which can be used in this invention include superconductive, extra-conductive, and P-type blacks with particle sizes ranging from 15 to 40 nm, nitrogen surface area of 40 to 1500 m²/g, and densities of about 10 to 30 pounds per cubic feet (0.16 to 0.48 g/cc). Carbon blacks such as these are further described, for example, by Probst in "Carbon Black Sci. and Tech.," supra and in "Plastics Additives and Modifiers Handbook," Edenbaum, J., ed., Vannostrand Reinhold, N.Y., p. 630–643, 1992, these descriptions being incorporated herein by reference. Commercial conductive carbon blacks which can be used in this invention include Vulcan™ XC-72, Black Pearls™ 2000, Printex™ XE-2, and Ketjen™ EC-300J.

The amount of carbon black particulate to be used in preparing the fluoroplastic compositions of this invention will be that small amount sufficient to impart desired conductivity thereto and yet permit desired melt processing of the blend of components. Generally, such amount will be 1 to 20 wt %, preferably 5 to 15 wt %, of the conductive fluoroplastic composition.

The blends of fluoropolymer, conductive particulate, and hydrocarbon polymer components (a), (b), and (c) can be prepared by blending means usually used in the plastics industry, such as compounding mill, a Banbury mixer, or a mixing extruder in which the hydrocarbon polymer and conductive particulate components are uniformly distributed throughout the fluoropolymer component. The mixing operation is conveniently carried out at a temperature above the melting point of the polymers. It is also feasible to blend the polymers and conductive particulate components in the solid state and then cause uniform distribution of the hydrocarbon polymer and conductive particulate components in the fluoropolymer matrix by passing the blend through a melt extruder, such as employed in fabrication of extruded articles.

The fluoropolymer and the hydrocarbon polymers may be used in the form, for example, of powders, pellets, or granules.

In preparing shaped articles, such as film or tubing, of the conductive fluoroplastic blend compositions of this invention, various extruders or other melt shaping equipment known in the art of polymer melt-processing can be used. Preferably the blend components can be melt blended in a mixing extruder and the extruded mixture chopped or cut into pellets or cubes which are then fed to a single screw extruder and melt-processed therein to produce extrudates or shaped articles of desired form.

The melt blended mixture of fluoropolymer, carbon black, and hydrocarbon polymer components can be pelleted or otherwise comminuted into desired particulate size and fed to the extruder, which will typically be a single-screw extruder, which melt-processes the blended mixture, for example, at 180° to 280° C., depending upon the melting point, melt viscosity, and thermal stability of the blend. Different types of extruders which can be used to extrude the fluoroplastic compositions of this invention are described, for example, by Rauwendaal, C., "Polymer Extrusion," Hansen Publishers p 23–48, 1986.

The die design of the extruder can vary, depending on the desired extrudate to be fabricated. For example, an annular die can be used to extrude tubing, useful in making fuel line hose, such as that described in U.S. Pat. No. 5,284,184 (Noone et al), which description is incorporated herein by reference.

Objects and advantages are illustrated in the following examples, but these examples should not be construed to unduly limit this invention.

EXAMPLES

A plurality of conductive fluoroplastic compositions of this invention were prepared by mixing the components and melt-processing the mixtures and forming strands thereof with a twin-screw extruder, chopping the strands, and feeding the chopped or particulate material to a single-screw extruder and forming extrudates in the form of conductive fluoroplastic film. The compositions are set forth in Table 1. For comparison, a number of control compositions (designated C-1, C-2, etc.) were prepared in which the hydrocarbon polymer component was omitted. Observations were made of the appearance and properties of the strands, the melt processing of the blends and the electrical resistivity of the extruded films. These data are summarized in Table 2.

In preparing the blends, the blend components, all in powdered form, were pre-weighed in a gallon plastic jar and mixed on a roller mill mixer. The blended powders were melt-mixed in a Haake Buchler Rheomex™ TW100 twin-screw extruder, fitted with high intensity screws, and extruded through a four-strand die. The screw speed varied from 100 to 150 rpm. The molten strands were water-quenched and chopped into pellets by a Killion pelletizer. The pH measurements were made by applying pH paper, wetted with distilled water, to a mass of pellets stored in a closed plastic jar, and the odor of the stored mass was noted upon opening of the storage jar. The pellets were dried of moisture in a forced air oven prior to being extruded into film, the weight of the pellets before and after drying was used to determine the amount of water on the pelleted compositions. The weight percentage of water removed was indicative of the surface roughness and porosity of the pellets. The resulting dried pellets were gravity-fed to a Haake Buchler Rheomex™ 0.75 inch (19 mm), a 25/1 L/D single-screw extruder with a 3/1 fast compression screw, connected to a 6-inch (152.4 mm) flat film die with a 20-mil (0.5 mm) gap. The screw of the extruder was run at 50 rpm. The extruder temperature profile was: feed zone, 130° C.; transition zone, 150° C.; metering zone, 190° C.; and die zone, 210° C. The extruded film was quenched on a water-chilled casting roll and collected. The volume resistance of the film extrudates was measured in accordance with ASTM D 257-78 (re-approved in 1983) using an ETS cell Model 803B and power supply Model 872A available from Electro Tech Systems, Inc.

TABLE 1

| Ex. No. | THV 500[a] | THV 200[a] | PE[b] | PEG[c] | CB[d] | CB[d] Type |
|---|---|---|---|---|---|---|
| C-1 | 100 | | | | | |
| C-2 | | 100 | | | | |
| C-3[e] | 87 | | | | 11 | XC-72 |
| C-4 | 91 | | | | 9 | XC-72 |
| C-5 | 90 | | | | 10 | XC-72 |
| C-6 | 89 | | | | 11 | XC-72 |
| C-7 | 88 | | | | 12 | XC-72 |
| 1 | 88 | | 1 | | 11 | XC-72 |
| 2 | 87 | | 2 | | 11 | XC-72 |
| 3 | 87 | | 1 | | 12 | XC-72 |
| 4 | 86 | | 2 | | 12 | XC-72 |
| 5 | 88 | | | 1 | 11 | XC-72 |
| 6 | 87 | | | 2 | 11 | XC-72 |
| 7 | 87 | | | 1 | 12 | XC-72 |
| 8 | 86 | | | 2 | 12 | XC-72 |
| 9 | 87 | | 1 | 1 | 11 | XC-72 |
| C-8 | | 88 | | | 12 | XC-72 |
| 10 | | 86 | 2 | | 12 | XC-72 |
| C-9 | 95 | | | | 5 | XE-2 |
| 11 | 93 | | | 2 | 5 | XE-2 |
| C-10 | 95 | | | | 5 | EC 300J |
| 12 | 93 | | | 2 | 5 | EC 300J |

TABLE 1-continued

| Ex. No. | THV 500[a] | THV 200[a] | PE[b] | PEG[c] | CB[d] | CB[d] Type |
|---|---|---|---|---|---|---|
| C-11 | 96 | | | | 4 | BP2000 |
| 13 | 94 | | | 2 | 4 | BP2000 |

[a]THV 500 & THV 200 means the above described 3M THV fluoroplastics with approximate monomer ratios of 60 wt % tetrafluoroethylene, 20 wt% hexafluoropropylene, and 20 wt % vinylidene fluoride for THV 500 and 40 wt %, 20 wt %, and 40 wt % of the respective monomers for THV 200.
[b]"PE" means Escorene ™ LL-3001.00 polyethylene, available from Exxon Chem. Co.
[c]"PEG" Means Polyox ™ WSR N-10 polyethylene glycol, available from Union Carbide Corp.
[d]"CB" means carbon black particulate. Vulcan XC-72 and Black Pearls BP2000 are available from Cabot Corp., Ketjen EC300J is available from Akzo Chem. Co., and XE-2 is available from Degussa AG.
[e]The fluoroplastic blend of C-3 contained 2 wt % calcium stearate.

TABLE 2

| | Extrusion and Extrudate Observations | | | | | Volume |
|---|---|---|---|---|---|---|
| Ex. No. | Temp. Profile[f] | Feed Character[g] | pH | Odor[h] | $H_2O^i$ wt % | Resistivity ohm-cm |
| C-1 | B | F | 2.5 | D | NM[k] | 1.6 E14 |
| C-2 | B | S | 2.5 | C | NM[k] | 1.2 E15 |
| C-3[j] | B | F | 5.5 | D | 0.07 | 3.3 E5 |
| C-4 | A | C | 3 | C | 0.08 | 2.8 E14 |
| C-5 | A | C | 3 | C | 0.08 | 3.1 E8 |
| C-6 | A | C | 2 | C | 0.09 | 6.6 E6 |
| C-7 | A | C | 1.7 | D | 0.13 | 5.2 E7 |
| 1 | B | F | 5.5 | B | 0.04 | 2.5 E5 |
| 2 | B | F | 5.5 | A | 0.04 | 2.2 E5 |
| 3 | B | F | 5.5 | B | 0.04 | 2.2 E5 |
| 4 | B | F | 5.5 | B | 0.06 | 2.9 E5 |
| 5 | C | F | 3.5 | B | 0.04 | 4.1 E5 |
| 6 | C | S | 3.5 | B | 0.02 | 2.3 E5 |
| 7 | C | F | 3 | B | 0.02 | 1.9 E5 |
| 8 | C | F | 3.5 | B | 0.01 | 2.2 E5 |
| 9 | B | F | 5.5 | A | NM[k] | 7.6 E5 |
| C-8 | B | F | 2 | B | 0.06 | 5.2 E5 |
| 10 | B | F | 4.5 | B | 0.06 | 1.6 E5 |
| C-9 | D | C | 1.8 | D | 3.34+ | 3.7 E14 |
| 11 | B | F | 5.5 | B | 0.06 | 1.4 E6 |
| C-10 | D | C | 2 | C | 14.7+ | 7.4 E14 |
| 12 | B | F | 5.5 | A | 2.9 | 1.1 E6 |
| C-11 | D | F | 3 | C | 5.7+ | NM[k,l] |
| 13 | B | F | 5.5 | B | 0.04 | 4.3 E7 |

[f]"Temp. profile" means the twin-screw compounding extrusion temperature profile of the extruder having 4 heating zones, viz:

| Temp. Profile | Zone 1 (Feed) | Zone 2 | Zone 3 | Zone 4 (Die) |
|---|---|---|---|---|
| A | 120–140° C. | 210–220° C. | 220° C. | 210–220° C. |
| B | 90 | 170–180 | 190–195 | 215–220° C. |
| C | 130 | 210 | 225 | 240 |
| D | 150–180 | 240–260 | 250–260 | |

[g]"C" means clumping or agglomeration of feed particulate, "S" means slight clumping of feed particulate, and "F" means the feed fed readily.
[h]"Odor" means the odor of the pelleted strands, on the scale of A, B, C, D with A being weakest odor and D being the strongest odor (acrid)
[i]These values, wt % weight loss upon drying pellets, is a measure of the porosity and surface roughness of the strands. Lower values indicate a smoother, less porous strand. The values followed by "+" indicates that before drying, water droplets (condensation) had formed in the jar storing the pellets.
[j]The fluoroplastic blend in Ex C-3 contained 2 wt % calcium stearate and exhibited smoke during extrusion in the twin-screw extruder.
[k]Not measured

TABLE 2-continued

| | Extrusion and Extrudate Observations | | | | Volume |
|---|---|---|---|---|---|
| Ex. No. | Temp. Profile[f] | Feed Character[g] | pH | Odor[h] | $H_2O^i$ wt % | Resistivity ohm-cm |

[i]Quality of blend pellets was too poor to feed film extruder.

The data of Table 2 show marked decrease in resistivity (i.e., increase in conductivity) and better melt processing, as shown by the extrusion and extrudate observations, of the conductive fluoroplastic compositions of this invention as compared to the control compositions.

A number of other conductive fluoroplastic compositions of this invention were similarly prepared using THV 500 Fluoroplastic, carbon black particulate commercially available as Vulcan™ XC-72 from Cabot Corp., and various hydrocarbon polymers commercially available as: Bynel™ E214 Acid-modified ethylene acrylate, Bynel™ E403 Acid-modified ethylene acrylate, Bynel™ E369 Anhydride-modified ethylene acrylate, Bynel™ 3101 Acid/acrylate modified ethylene vinyl acetate, and Surlyn™ 1650 zinc salt of ethylene acrylic acid all from DuPont; Fina 3374X polypropylene from Fina Oil & Chemical Co.; EPsyn™ 5206 ethylene, propylene, butadiene polymer (EPDM) from Copolymer Rubber & Chemical Corp.; AC 6A oxidized polyethylene wax from Allied Chemical Co.; and Carbowax™ PEG 8000 polyethylene glycol available from Union Carbide Corp. The evaluation of these other compositions of the invention showed them to have desirable properties similar to those of the foregoing examples.

Various modifications and alterations of this invention will be apparent to those skilled in the art without departing from the scope and spirit of this invention.

What is claimed is:

1. A melt-processable conductive fluoroplastic composition consisting essentially of a blend of:
   (a) a major amount of a melt-processable, thermoplastic fluoropolymer component having at least 5 wt % of its interpolymerized units derived from vinylidene fluoride and more than 25 wt % of its interpolymerized units derived from a combination of tetrafluoroethylene and hexafluoropropylene, such that the fluoropolymer has an amount of fluorine up to 75 wt %,
   (b) from 1 to 20 percent by weight of conductive particulate component comprising conductive carbon black particles, and
   (c) from 0.1 to 20 percent by weight, to reduce melt defecting of the composition of a polymer component comprising a polymer of ethylene and/or propylene.

2. A fluoroplastic composition according to claim 1 wherein said fluoropolymer component is a thermoplastic terpolymer derived by copolymerizing 35 to 70 wt % tetrafluoroethylene, 10 to 30 wt % hexafluoropropylene, and 10 to 50 wt % vinylidene fluoride.

3. A fluoroplastic composition according to claim 1 wherein said fluoropolymer component has an ASTM D 1238 melt index of less than 1000 g/min, measured at 265° C. and 5 kg.

4. A fluoroplastic composition according to claim 1 wherein said polymer component further comprises a poly(oxyalkylene).

5. A fluoroplastic composition according to claim 1 wherein said polymer component comprises a homopolymer of ethylene or propylene.

6. A fluoroplastic composition according to claim 1 wherein said polymer component comprises a copolymer of ethylene and propylene.

7. A fluoroplastic composition according to claim 1 wherein said polymer component comprises a copolymer of ethylene or propylene with at least one other ethylenically-unsaturated comonomer.

8. A fluoroplastic composition according to claim 1 wherein said polymer component comprises copolymers of ethylene and propylene or either of them with higher alpha-olefins.

9. A fluoroplastic composition according to claim 1 wherein said polymer component comprises copolymers of ethylene with 1-butene, 1-hexene, 4-methyl-1-pentene, or 1-octene.

10. A fluoroplastic composition according to claim 1 wherein said polymer component comprises a homopolymer of ethylene.

11. A fluoroplastic composition according to claim 1 wherein said polymer component comprises a homopolymer of propylene.

12. A fluoroplastic composition according to claim 1 wherein said polymer component comprises a polymer of ethylene having a melt flow index between 0.1 and 1000 g/min. as measured by ASTM D 1238 at 190° C. and a loading of 2.16 kg.

13. A conductive extrudate comprising the blend of claim 1.

14. A conductive extruded film comprising the blend of claim 1.

15. A conductive tubing comprising the blend of claim 1.

16. A method of making the fluoroplastic composition of claim 1, which comprises blending said components (a), (b), and (c).

17. A method of making a conductive shaped plastic article which comprises dry-blending a mixture consisting essentially of (a) a major amount of a melt-processable, thermoplastic fluoropolymer component having at least 5 wt % of its interpolymerized units derived from vinylidene fluoride and more than 25 wt % of its interpolymerized units derived from a combination of tetrafluoroethylene and hexafluoropropylene, such that the fluoropolymer has an amount of fluorine up to 75 wt %, (b) from 1 to 20 percent by weight of a conductive particulate component comprising conductive carbon black particles, and (c) from 0.1 to 20 percent by weight of a polymer component comprising a polymer of ethylene and/or propylene, and melt-processing the resulting blend to form said article.

18. The method according to claim 17 wherein said melt-processing comprises extrusion.

19. A fluoroplastic composition according to claim 1 wherein said polymer component comprises a copolymer of ethylene and propylene with at least one other ethylenically-unsaturated comonomer.

20. A method of reducing melt-defects of a fluoroplastic article comprising melt-processing the composition of claim 1 to form a conductive shaped plastic article.

* * * * *